Oct. 14, 1947.  B. BADER  2,429,042
METHOD OF DEPOSITING DOUGH AND APPARATUS THEREFOR
Filed Aug. 15, 1944  3 Sheets-Sheet 1

BERNARD BADER
Inventor

By Smith & Tuck
Attorney

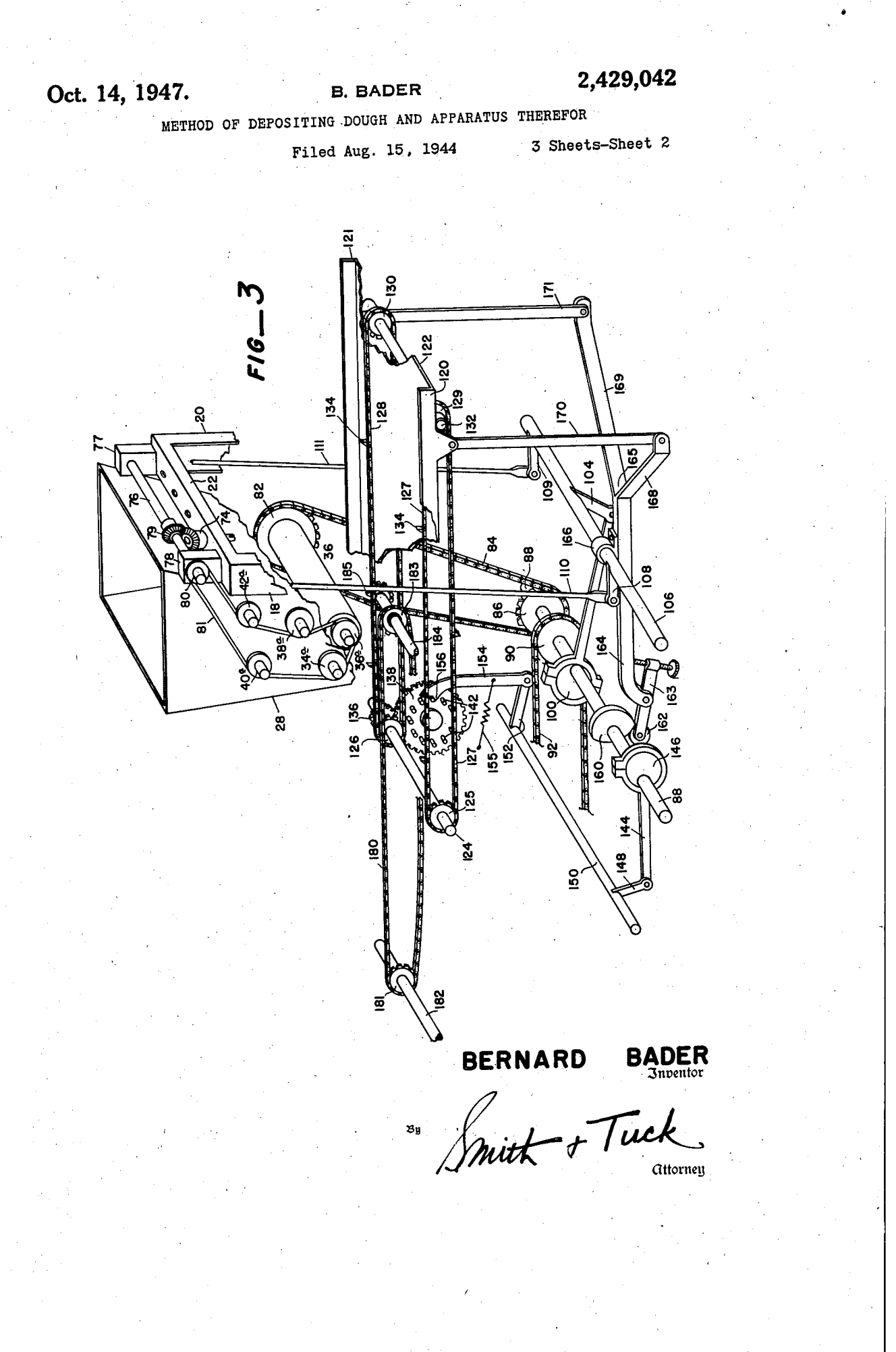

Oct. 14, 1947.   B. BADER   2,429,042
METHOD OF DEPOSITING DOUGH AND APPARATUS THEREFOR
Filed Aug. 15, 1944   3 Sheets-Sheet 2

FIG-3

BERNARD BADER
Inventor

By Smith + Tuck
Attorney

Oct. 14, 1947. B. BADER 2,429,042
METHOD OF DEPOSITING DOUGH AND APPARATUS THEREFOR
Filed Aug. 15, 1944 3 Sheets-Sheet 3
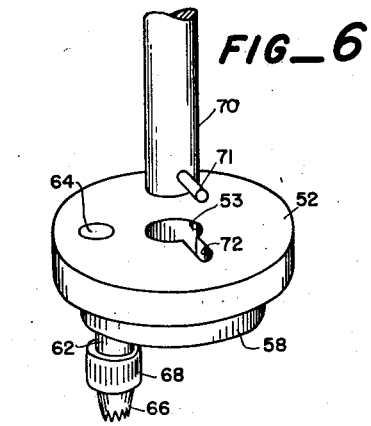
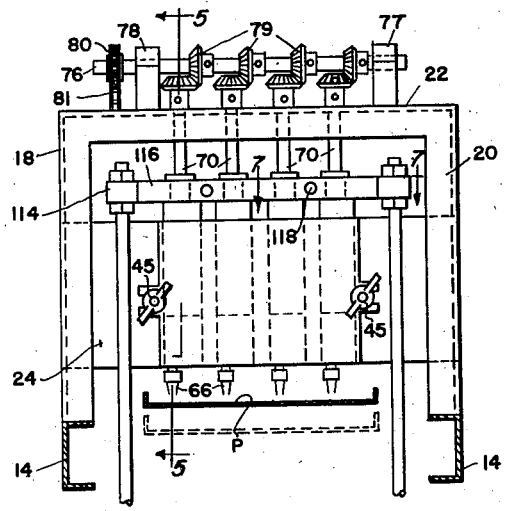
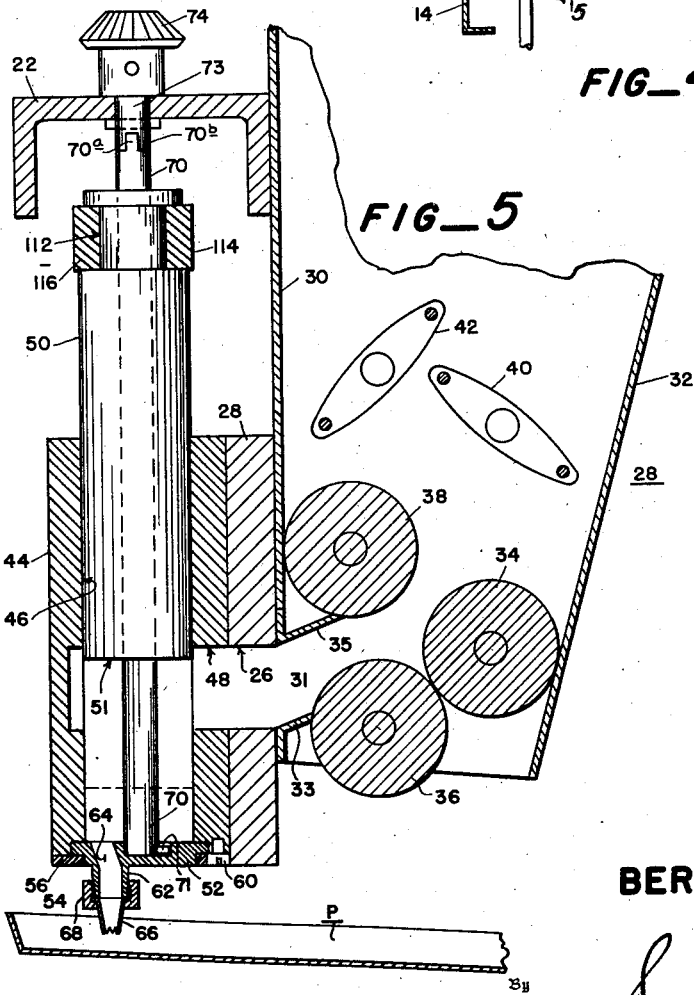
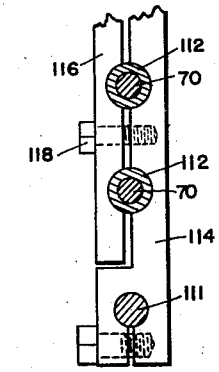
BERNARD BADER
Inventor
Smith & Tuck
Attorney Patented Oct. 14, 1947

2,429,042

UNITED STATES PATENT OFFICE 2,429,042

METHOD OF DEPOSITING DOUGH AND APPARATUS THEREFOR

Bernard Bader, Seattle, Wash.

Application August 15, 1944, Serial No. 549,520

8 Claims. (Cl. 107—54)

This invention relates to a method of depositing dough and apparatus therefor and, more particularly, to the art of forming and depositing soft cake doughs to produce cookies or miniature cakes.

In the art of cake-making, bakers have for many years employed soft cake doughs to produce what is commonly known as Danish or Swiss cookies. Such soft cake doughs can be distinguished from yeast-containing doughs in that they are "short" and the material is rather friable, due to the fact that it largely contains shortening, sugar, flour and flavoring, and has a very low moisture content. The soft cake doughs are moldable and are capable of extrusion through suitable nozzle tips. The common practice in the prior art has been to place a quantity of dough in a pastry bag having a nozzle. By twisting the bag and then squeezing it, the dough is extruded through the nozzle, which, when manipulated, will produce a variety of shapes and forms of cookies in simulation of flowers and other conventional objects.

Heretofore, one of the prime difficulties in this cookie-making art has been the great amount of manual labor involved, with its consequent low production per man at a relatively high cost. Attempts have been made to mechanically produce these cookies, but such attempts have been rather disheartening in their results, in that a great amount of skill and attention has been required of the operators of such mechanisms, and a consequent slight gain over manual production of such cookies.

Other disadvantages reside in lack of uniformity of product, undue complexity of such mechanisms as have been produced, excessive costs of such mechanisms, high power consumption, and other similar disadvantageous factors.

Having in mind the defects of the prior art methods and apparatus, it is an object of my invention to provide a method of depositing dough which comprises few steps and is easily adaptable to simple mechanism.

Another object of my invention is to provide, in a method of the type described, procedure whereby a cookie may be formed by extrusion and the following dough severed therefrom, without disfiguring the formed cookies.

A still further and more specific object of my invention is the provision, in a cookie forming mechanism, of extruding and cutting-off means that operate simply, automatically, and accurately, over long periods of time, for the uniform production of great quantities of cookies.

The foregoing objects and others ancillary thereto, I prefer to accomplish as follows:

According to a preferred practice with my invention, the principal steps of the method are: containing the dough in a confined space; applying pressure thereto, and extruding the same through a suitable orifice; and then subjecting the following dough, when the cookie is formed, to a negative pressure, whereby the following material is severed from the formed cookie. This procedure may be modified by revolving the orifice while the dough is passing therethrough, or the surface upon which the dough is deposited may be moved toward and away from the orifice in time co-ordinated to the positive and negative pressurizing steps, to facilitate severance of the extruded material from that following.

This method may be practiced by several mechanical means, and in a preferred form of my apparatus, I mount upon a suitable frame structure, a feeding and extrusion mechanism, with respect to which bakers' trays are indexed during the depositing of a series of cookies. Specifically, the feeding and extrusion mechanism comprises a hopper having suitable beaters and rollers for manipulating and moving dough placed therein, into the actual extrusion apparatus. The extrusion apparatus comprises a chamber having a side port through which dough is fed, and a reciprocating piston to apply pressure upon the dough to force the dough out of the extrusion orifice.

In a preferred form of the invention, the orifice or nozzle is mounted to revolve, and is non-axially positioned with respect to its axis of revolution, in order that a ring or flower shaped cookie may be formed. Means are included for reciprocating the piston and for revolving the extrusion nozzle. Under this feeding and extrusion mechanism is a suitable conveyor means, of the intermittent motion type, which receives and advances bakers' trays under the nozzle in step-wise manner. In addition to moving these trays in a forward direction, they are also raised and lowered during non-advancing periods, for the purpose of receiving the cookies from the forming or extruding nozzle and to facilitate the severance of the cookies from the dough following in the nozzle. Similarly, suitable mechanism is provided for raising and lowering the trays. The reciprocating mechanism for the piston, the rotary mechanism for the extrusion nozzle, the indexing-in-forward-motion mechanism of the trays, and the means employed for raising and lowering the trays are all mounted within the frame structure that supports the feeding and extrusion apparatus. All these elements are so co-ordinated and timed, that a sequence of steps is produced to coincide with the steps of my process for depositing dough.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a view in side elevation of my cookie depositing mechanism;

Fig. 2 is a perspective view of a form of cookie produced by my mechanism;

Fig. 3 is a schematic view in perspective showing the operating means employed in my cookie forming mechanism;

Fig. 4 is a fragmentary view of one face of the dough extruding mechanism with portions of the machine omitted for convenience of illustration;

Fig. 5 is an enlarged vertical sectional view taken on line 5—5 of Fig. 4 through the feeding and extruding elements of my dough depositing mechanism;

Fig. 6 is a view in perspective of the extrusion nozzle and a portion of the shaft employed for rotating the same; and Fig. 7 is a sectional view taken on line 7—7 of Fig. 4.

A preferred embodiment of my invention, referring to Figs. 1, 3 and 4 of the drawings, includes a supporting frame F, having legs 10 and 12, upper horizontal member 14 and intermediate horizontal member 16. On this frame is mounted the operating and actuation mechanism. Rising above member 14, forming the bed of the frame, are spaced-apart posts 18, 20, having cross-header 22 between their upper ends. This arrangement constitutes a superstructure employed in supporting the dough feeding and extruding apparatus.

Dough feeding mechanism

Transversely of the frame and supported on one side of the posts 18, 20 is an upright plate 24, which has a slotted port 26, longitudinally therein. On plate 24 is mounted hopper 28, comprising the forward upright wall 30, the after-sloping wall 32, and suitable enclosing side walls. Wall 32 converges toward wall 30 in downward extension. The hopper is unclosed at the bottom, but dough is precluded from dropping therethrough by the use of closely fitted rollers 34 and 36, that rotate in the directions indicated by the arrows in Fig. 4.

Roller 34 rotates so that its outer portion or periphery is in close proximity to wall 32 of the hopper, and roller 36 rotates with surface contact to roller 34 and to the lip 33 forming one side of the throat 31 which extends from the hopper to the slot 26. A counter-rotating roller 38 is placed above and slightly forward of the rollers 34 and 36 and rotates closely adjacent the lip 35. The result, when rollers 34, 36 and 38 are rotated as indicated, is to move the dough out of the upper space between walls 30 and 32 and bend and move it into the slot 26.

To facilitate the homogenizing of the dough after it is placed in the hopper, I employ beaters 40 and 42, rotatable as indicated in Fig. 4, above the rollers to work the dough and knock out air-pockets or voids and urge the dough downward to the rollers.

Dough extruding mechanism

The principal operating parts of the extrusion mechanism are all mounted within a die block 44, that is detachably bolted to the plate 24 by suitable wing-nuts 45, as shown in Fig. 5. The block 44 comprises a plurality of cylindrical passages 46, extending from top to bottom. Each passage forms a chamber that communicates, on one side by means of a port 48, with the slot 26 and the throat passage 31 from the hopper. Within each chamber 46 is mounted the piston 50 whose pressure face 51, during reciprocating motion, is moved from above the opening 48 to a point there-below, as suggested by dotted lines in Fig. 5. In the raised position, dough is forced into the chamber under the piston, and, by descending, the piston forces the dough downward in chamber 46. The lower end of passage 46 is closed by means of the rotary disc 52, which is retained in the block through the co-action of the retainer plate 56. Plate 53 has openings 54, each to receive the reduced portion 58 of a disc 52. Plate 56 is held in place by screws 60 that engage in the bottom of block 44.

As shown in Fig. 5, disc 52 has a collar 62, non-axially located on the bottom thereof, and a passage 64 extends from the chamber within the die block 44 downward and outward through collar 62. An extrusion nozzle 66 is positioned at the lower end of the passage 64 and is there secured by means of the retainer nut 68 that is threadedly engaged on collar 62.

The inner face of the disc 52 has socket 53 to receive the lower end of shaft 70 which carries the lateral key pin 71 that fits in the radial notch 72 extending outward to one side of socket 53. Shaft 70 extends upward through an axial passage within the piston 50 to a point thereabove, where, on its upper end, shaft 70 has a tongue 70a which engages in kerf 70b of the stub shaft 73, to which is coupled gear 74.

It will be seen in Fig. 4 that there is a plurality of passages 46 in block 44, in each of which is placed a piston 50; and that, consequently, there is a plurality of shafts 70, stub shafts 73, and gears 74. Transverse the machine frame and intersecting the axis of the bevel gears 74, is horizontal shaft 76, mounted in suitable bearings 77 and 78. Shaft 76 has secured thereto a plurality of bevel gears 79, each of which engages one of the gears 74. On an outboard end, shaft 76 has a sprocket 80, over which passes chain 81.

To the ends of the shafts upon which are mounted rollers 34, 36 and 38, and beaters 40 and 42, are also secured sprockets 34a, 36a, 38a, 40a and 42a, and the belt 81 is led over these sprockets in the manner shown in the perspective view of Fig. 3.

On the end of roller 36, opposite from the location of sprocket 36a, is sprocket 80 over which passes the chain 84 from sprocket 86 on cam-shaft 88. By power applied to sprocket 90, through the instrumentality of chain 92 operatively connected with counter-sprocket 94 coupled to sprocket 95 on motor 96 through the instrumentality of the drive chain 98, the cam-shaft 88 is caused to rotate.

Piston reciprocating mechanism

Shaft 88 has an eccentric cam disc 100, with which is operatively joined the connecting rod 102 that is pivotally connected to crank 104, extending from the rock-shaft 106 mounted in bearings 105. Shaft 106 has a pair of similar cranks 108 and 109 above which rise the piston reciprocating rods 110 and 111. The upper end of each piston 50 has an annular groove 112, which is engaged by a half-bearing or groove formed in cross header 114 that extends laterally of the machine between the upper ends of rods 110 and 111. The piston end and the cross-head 114 are secured together by means of the similarly grooved clamp bar 116 secured to member 114 by bolts 118 as shown in Fig. 7. Thus it will be seen that when the shaft 88 is rotated and the connecting rod 102 is oscillated, the shaft 106 will be rocked to produce reciprocal motion of the rods 110 and 111 and in turn to reciprocate pistons 50 in their chambers 46 within die block 44.

Pan movement

The bakers' pans P, or trays, employed in connection with this mechanism, are shallow, rectangular pans, wide enough to receive dough that is formed into cookies from the several nozzles shown in Fig. 4. The pans are intermittently raised and lowered with respect to the nozzle in a supplemental pan-carrying frame comprising the side rails 120 and 121 and the bottom 122. This frame is supported upon upper horizontal members 14 of frame F and mounted for swinging movement relative shaft 124 which is disposed laterally of the machine, as can be seen in Fig. 1. Shaft 124 has a pair of sprockets 125 and 126, over which the pass the chains 127 and 128 respectively, these chains also passing over sprockets 129 and 130 mounted on shaft 132, journalled at the outboard end of the supplemental frame on the underside of members 120 and 121. The bottom 122 has slots 123, through which the upper edges of the sprockets 129 and 130 protrude, so that the chains 127 and 128 disposed above the bottom may pass to the underside thereof. These chains 127 and 128 each have a series of lugs 134 which engage the trailing edge of a pan to move the same forwardly.

Intermittent motion is applied to chains 127 and 128 by means of the gear 136 which is in mesh with gear 138 mounted for rotation upon the shaft 140. The face of gear 138 carries a plurality of indexing pins 142 as shown in Fig. 3. A connecting rod 144 operatively coupled with eccentric disc 146 is pivotally connected to crank 148 on shaft 150, which link in turn is connected by crank 152 to the indexing arm 154. Arm 154 moves up and down and has lug 156 thereon to engage sequentially pins 142 and intermittently turn gears 138 and 136 whereby the chain 127 is indexed forward in short intervals. Arm 154 is urged into pin engagement position by spring 155.

The pan carrying frame is raised and lowered in a swinging motion about the axis of shaft 124 through the action of cam 160, which is engaged by cam-follower roller 162 on arm 163, adjustably mounted on arm 164, that is connected to bearing 166 on rock-shaft 106. Under the action of cam 160 the arms oscillate about the axis of shaft 106. Arm 164 is bifurcated at 165, in the manner illustrated in Fig. 3, and diverging arms 168 and 169 extend to under the outer corners of the bed 122 of the pan-carrying frame. Links 170 and 171 join arms 168 and 169 to the rails 120 and 121 respectively, and transmit the oscillatory motion of arm 164 into raising and lowering motion of the bakers' pans carried by the upper swingingly mounted frame.

By reason of this last described oscillatory motion, the tray or pan P moves between the dotted line position of Figs. 4 and 5 and the solid line position therein shown.

When pans P are first introduced into the machine they are deposited upon the continuously moving endless chain 180 that passes over sprocket 181 on shaft 182, and sprocket 183 on shaft 184 which is caused to rotate by reason of the sprocket 185 having operative engagement with the chain 84 in the manner shown in Fig. 3. Chain 180 overlaps the intermittently indexed chains 127, 128.

By reason of this mechanism, the constantly advancing chain 180 urges a following pan forward against a preceding intermittently moving pan in advance thereof, and, as the leading pan is filled with cookies, a new pan immediately takes its place and the cookie depositing operation continues.

Depositing operation

Dough is prepared by the mixing of the necessary ingredients in the usual manner whereby they are combined into a fairly homogeneous mass. Quantities of this dough are then deposited in the hopper 28, where the dough is submitted to the beating action of the rotary beaters 40 and 42, and is rolled, advanced and deflected by rollers 34, 36 and 38 sidewise into the throat 31, through the passage 26, and into the chamber below piston 50. Upon descent of pistons 50 a quantity of this dough is pressed downward and measured portions are extruded through passages 64 and nozzles 66. Simultaneously with the extrusion, the revolution of the nozzle about its axis takes place. During extrusion periods a pan P is in the raised but motionless position of Figs. 4 and 5, while the cookie is being deposited. This idle moment is obtained by the concentrically arcuate surface of cam 160, which holds the swinging support for the pan in the upper position. Approximately ⅞ of a revolution of the nozzle is required to form the cookie, and when this amount of travel has been reached, the piston is at the bottom of its stroke, and has started to rise, while simultaneously, the pan P begins to descend. The result is that the deposited cookie dough is drawn downward away from the dough that remains in the nozzle 66; and also that the dough within the nozzle is subjected to slight negative pressure, caused by the receding action of the piston. These two forces combine to sever the dough of the cookie from the dough within the nozzle and tend to draw a slight peak upon the cookie.

Thereafter, the pan is indexed forwardly sufficiently to receive the next row of cookies and is again raised to the cookie receiving position; during which time the piston has moved to the upper limit of its stroke, a new charge of dough is forced into the chamber 46 under the piston, and the latter has begun to descend.

As a mode of producing a cookie of different form, I have found that, by eliminating rotary motion of the extrusion nozzle 66, a star shaped cookie can be dropped from the extrusion mechanism. In such instance the belt 81 is shortened so as to omit sheave 80 on shaft 76 and the shafts 74 remain motionless even though the reciprocating action of the pistons 50 continues.

A finger-shaped cookie or elongated bar can be formed by eliminating rotation of the nozzle, as above, and also by moving the receiving surface of the pans forward simultaneously with extrusion of the dough. The forward movement of the pan during deposition of the dough is obtained by immobilizing the indexing mechanism and by applying constant rotation to shaft 124 to thus impart constant motion to chains 127.

By continuously supplying dough to the hopper 28, the operation can be continuously practiced for many hours on end with regular and repeated production of great quantities of like cookies.

In accordance with the customary practices of sanitation and cleanliness around a bakery, when the machine comes to the end of a run and it is desired to clean the same, the operator shuts off the motor 96 and the mechanical operation ceases. He then disconnects the die block 44 from plate 24 by unloosening the wing nuts 45 after having first disengaged the retainer bar 116 from the cross-head 114 by loosening bolts 118. The die block 44 with its nozzles and pistons is removed from the machine, it being apparent as shown in Fig. 5 that the shaft 70 is removably keyed to the stubshaft 80a to facilitate such disengagement. It can be seen that substantially all the dough handling mechanism is removed from the machine in a single unit and that such can be cleaned by withdrawing the pistons from the chambers 46. By removing the retainer plate 56, the rotary discs 52 can be removed. Also, it should be noted that the nozzles 66 are removable and separable and thus access through the passages 64 is permitted to remove any dough that might still be therein, not having been extruded in the final cookie-depositing operation.

While I have shown and described particular embodiments of my invention, it will occur to those skilled in the art that various changes and modifications may be made without departing from the invention, and I, therefore, aim in the appended claims to cover all such changes and modifications as fall within the true spirit and scope of my invention.

Having thus described my invention, I claim:

1. In a dough depositing mechanism, extrusion means, comprising: a body having a chamber including a side inlet opening thereto; a piston reciprocal in said chamber across said inlet opening; the wall of said chamber, toward and away from which said piston moves in reciprocation, being rotatable and having an eccentric outlet passage; a nozzle at the outer terminus of said outlet passage; means for reciprocating said piston; and means for rotating said rotatable wall.

2. In a dough depositing mechanism, extrusion means, comprising: a body having a chamber and including a side inlet opening thereto; a piston reciprocal in said chamber across said inlet opening; means for reciprocating said piston; a disc rotatable in and closing the end of said chamber toward and away from which said piston reciprocates; a shaft axially rotatable in said piston and coupled to said disc; means for rotating said shaft; said disc having a passage eccentrically located therein; and a nozzle on the outer terminus of the outlet passage.

3. In a dough forming mechanism, a hopper to receive dough, said hopper having a lower side opening from the inward edges of which toward the opposite wall inwardly extend lips, a pair of first and second rollers rotatable in opposition to each other in spaced apart relation, said first roller having peripheral contact with the upper lip of said opening, and said second roller having peripheral contact with the wall of said hopper opposite said opening, a third roller rotatable in like direction with said second roller and having peripheral contact therewith, said third roller also having peripheral contact with the lower lip of said opening, means for rotating said rollers in their respective directions, and means to receive dough from said opening and to form the same into unitary elements.

4. In a dough forming mechanism, a hopper to receive dough, said hopper having a side opening from the edges of which toward the opposite wall inwardly extend lips, a pair of first and second rollers rotatable in opposition to each other in spaced apart relation, said first roller having peripheral contact with the upper lip of said opening, and said second roller having peripheral contact with the wall of said hopper opposite said opening, a third roller rotatable in like direction with said second roller and having peripheral contact therewith, said third roller also having peripheral contact with the lower lip of said opening, means to beat and urge downwardly to said spaced apart rollers dough placed in said hopper, means for rotating said rollers in their respective directions, and means to receive dough from said opening and to form the same into unitary elements.

5. In a dough forming mechanism, a hopper to receive dough, said hopper having a lower side opening from the inward edges of which toward the opposite wall inwardly extend lips, a pair of first and second rollers rotatable in opposition to each other in spaced apart relation, said first roller having peripheral contact with the upper lip of said opening, and said second roller having peripheral contact with the wall of said hopper opposite said opening, a third roller rotatable in like direction with said second roller and having peripheral contact therewith, said third roller also having peripheral contact with the lower lip of said opening, means for rotating said rollers in their respective directions, means to receive dough from said opening and to form the same into unitary elements; a body having a chamber including a side inlet opening thereto in registry with the lower side opening of said hopper; a piston reciprocal in said chamber across said inlet opening; the wall of said chamber, toward and away from which said piston moves in reciprocation, being revoluble and having an eccentric outlet passage; a nozzle at the outer terminus of said outlet passage; means for reciprocating said piston; and means for revolving said revoluble wall.

6. The method of depositing cookie dough, comprising: forcing a stream of dough through an opening, depositing dough from said stream for a predetermined interval of time, terminating the flow of said stream of dough and, simultaneous with said termination, obtaining a vertical separating movement between said opening and the dough deposit while subjecting the following dough in said opening to a negative pressure.

7. The method of depositing cookie dough, comprising: forcing a stream of dough through an opening and rotating said stream in a circular path, depositing dough from said stream for a predetermined interval of time, terminating the flow of said stream of dough and, simultaneous with said termination, obtaining a vertical separating movement between said opening and the dough deposit while subjecting the following dough in said opening to a negative pressure.

8. The method of depositing cookie dough, comprising: pressurizing dough in a vessel having an opening to form a stream of said dough, depositing dough from said stream for a predetermined interval of time while rotating said stream in a circular path, de-pressurizing the dough in said vessel and, simultaneously therewith initiating a vertical separating movement between said opening and the dough deposit while subjecting the dough of said vessel to a negative pressure.

BERNARD BADER.

REFERENCES CITED

The following references are of record in the file of this patent:

UNITED STATES PATENTS

| Number | Name | Date |
| --- | --- | --- |
| 2,041,432 | Roth | May 19, 1936 |
| 2,073,439 | Balton | Mar. 9, 1937 |
| 1,903,570 | Kremmling | Apr. 11, 1933 |
| 1,268,003 | Granlund | May 28, 1918 |
| 2,067,200 | Mayhew | Jan. 12, 1937 |
| 1,703,434 | Smith | Feb. 26, 1929 |
| 1,458,872 | Brobst | June 12, 1923 |